| EXAMPLE | T | | U | |
|---|---|---|---|---|
| No. | CHEMICAL | MOLE RATIO | CHEMICAL | MOLE RATIO |
| 15 | METHALLYL ALCOHOL | .24 | TONOX | .15 |
| 17A+B | GLYCOL | — | TONOX | .17 |
| 18C+D | n-PROPYL ALCOHOL | .20 | ETHYLENE DIAMINE | .15 |
| 19C+D | ALLYL ALCOHOL | .20 | ETHYLENE DIAMINE | .15 |
| 20 | METHYL ALCOHOL | .20 | TONOX | .15 |
| 21 | ISOPROPYL ALCOHOL | .20 | TONOX | .15 |
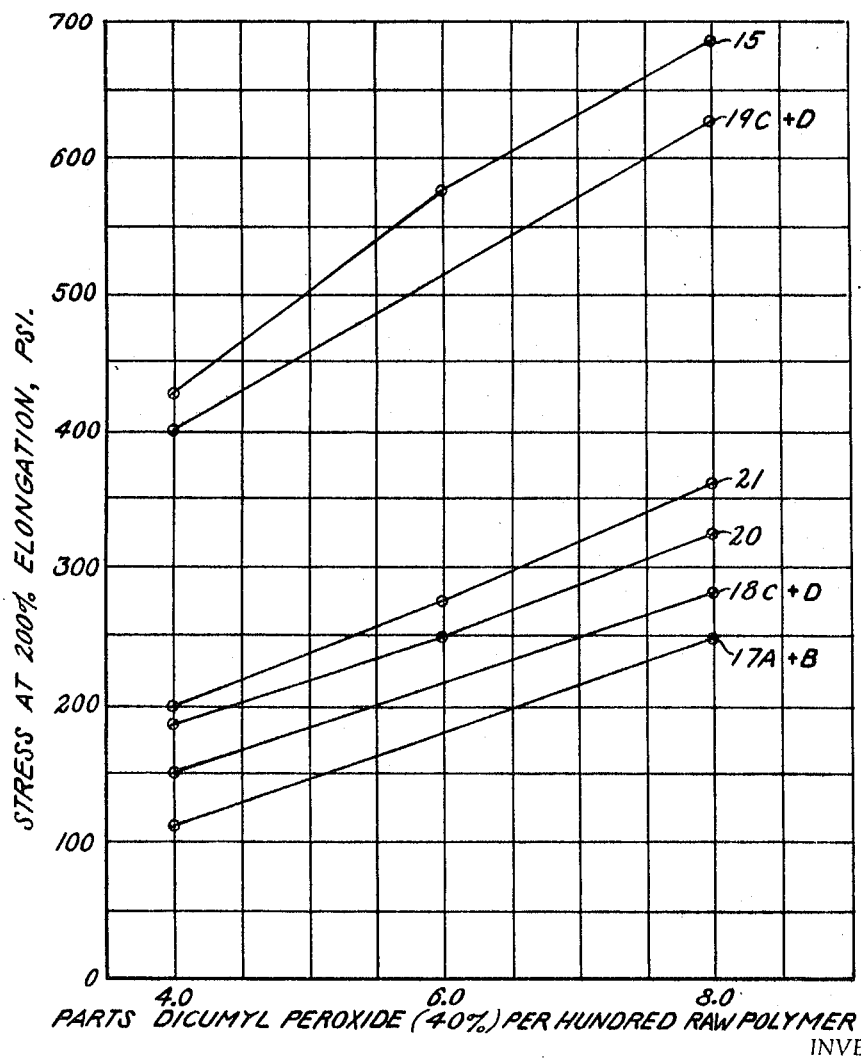
INVENTOR.
ROBERT N. KIENLE
BY Willard R. Sprowls
ATTORNEY

United States Patent Office 3,457,326
Patented July 22, 1969

3,457,326
REACTION PRODUCT OF A POLYESTER, DIISO-
CYANATE, ETHYLENICALLY UNSATURATED
ALCOHOL AND A UREA LINKAGE FORMER
Robert N. Kienle, Grosse Pointe, Mich., assignor to
Uniroyal, Inc., a corporation of New Jersey
Continuation-in-part of application Ser. No. 13,136,
Mar. 7, 1960, which is a continuation-in-part of application Ser. No. 604,083, Aug. 15, 1956. This application Apr. 22, 1965, Ser. No. 449,955
Int. Cl. C08d 9/08
U.S. Cl. 260—858
10 Claims This invention relates to improved polyurethane polymers and elastomers, and to a method of making the same.

This application is a continuation-in-part of copending application, Ser. No. 13,136, filed Mar. 7, 1960, which, in turn, was a continuation-in-part of now abandoned application, Ser. No. 604,083, filed Aug. 15, 1956.

The term "polyurethane" is used herein in the sense of organic diisocyanate modified polyesters and polyethers.

One object of this invention is to provide an improved rubbery polymer of the polyurethane type which can be handled upon factory equipment in much the same manner as ordinary rubber.

Another object is to provide a polyurethane rubber which is stable in the raw state, that is, which does not change its characteristics to an undesirable extent while in transit or storage between the time of its initial manufacture in the chemical plant and the time of its final fabrication in the rubber factory.

Still another object of the invention is to provide an elastomer which may be cured most effectively by means other than those used in the cure of the urethanes of the prior art in which the isocyanate group is an essential part in the curing step. Thus the material of this invention may be compounded for curing or vulcanizing at curing temperatures conventionally used in the rubber factory without the disadvantages inherent in the prior art "isocyanate cured" polyurethanes.

A further object of the invention is to provide an improved elastomer of the polyurethane type which can be varied to a desired Mooney viscosity.

A further object of the invention is to provide an improved elastomer of the polyurethane type having terminal unsaturation which can be varied in amount while holding the Mooney viscosity of the elastomer constant.

A further object of the invention is to provide an improved elastomer of the polyurethane type which can be cured to the same degree as known polyurethane elastomers but with less curative. Conversely, it is an object of the invention to provide a polyurethane elastomer which can be brought to a higher degree of cure than possible with known polyurethane elastomers using the same amount of curative.

It is a further object of this invention to provide an improved elastomer of the polyurethane type having the characteristics set forth in the preceding paragraph, and having a sufficiently high Mooney viscosity to enable said elastomer to be processed on conventional rubber equipment such as two-roll mills, calenders, Banbury mixers, etc.

The manner in which the invention realizes the foregoing objects, as well as additional objects and advantages, will be made evident in the subsequent exposition of the invention.

In accordance with the invention, it has now been discovered that the several objects and advantages are derived from the incorporation of certain organic chemicals into the urethane elastomer during its preparation. The organic chemicals are (1) an ethylenically unsaturated chain-terminating substance and (2) a urea linkage forming material.

The chain-terminating materials, hereinafter referred to as T, are mono-functional with respect to their ability to react with the isocyanate group, i.e., they have but one grouping with available active hydrogen as represented by OH, and they contain some non-benzenoid unsaturation, i.e., specifically one or more carbon to carbon multiple bonds of non-benzenoid or ethylenic character. As is well understood by those skilled in the art, the true unsaturation of ethylenic materials, as evidenced by their readiness to form saturated addition products, is quite distinct from the so-called benzenoid unsaturation of materials like benzene or furan which frequently yield unsaturated substitution products under circumstances that would cause addition and saturation at ethylenic multiple bonds. The aromatic or benzenoid type of unsaturation will not serve the purposes of the present invention, which requires the ethylenic (i.e., non-benzenoid or non-aromatic) type of unsaturation. Suitable chain terminating materials are substances wherein the number of carbon atoms does not exceed 20, said substances containing only one group reactive with isocyanate and containing ethylenic unsaturation, selected from the group consisting of primary alcohols, secondary aliphatic alcohols, and secondary aliphatic-aromatic alcohols.

The urea linkage forming materials, hereinafter referred to as U, contain two active hydrogen atoms and are selected from the group consisting of diamines, water, amino-alcohols, and amino-phenols.

For purposes of this invention, the basic urethane elastomer is composed of the reaction product of an organic diisocyanate free of isocyanate-reactive groups, hereinafter referred to as D and a substantially linear, substantially saturated, substantially hydroxy-terminated material, hereinafter referred to as P, selected from the group consisting of polyesters having a molecular weight of from 1000 to 4000 and having an acid number of less than 6, and polyethers having a molecular weight of from 500 to 3000 and having the ether linkage thereof separated by linear alkyl hydrocarbon chains of from two to five carbon atoms.

The raw polymer prepared with the above chemicals has been found to be an unusually stable material, that can be stored and handled much like ordinary rubber, without undergoing undesirable spontaneous changes with the passage of time, even if no special precautions are taken to protect the raw elastomer from the ambient atmosphere.

It is well known in alkyd polymerization that the addition of a mono-functional material will limit the length of the polymer chains, in proportion to the amount of such mono-functional material. In the analagous urethane polymerization of the instant invention, the use of increasing amounts of the mono-functional chain-terminating material T would lower the Mooney viscosity of the resultant elastomer as a consequence of the shorter polymeric chains which have lower molecular weights. However, it has been discovered that the addition of the urea linkage forming material U will raise the Mooney viscosity of the resultant chain-terminated elastomer directly proportional to the amount of the urea linkage forming material. The effect of the urea linkage former in raising the Mooney viscosity of the urethane polymer is above and beyond its chain lengthening effect and is believed to be due to the attraction between polymer chains caused by the polar nature of the urea linkage in said chains. Thus the Mooney viscosity can be adjusted by varying the relative amounts of the chain-terminating material T and/or the urea linkage former U. As the chain-terminating material T and the urea linkage former U have opposite effects on Mooney viscosity, it is possible to increase or decrease the amount of terminal unsaturation while holding the Mooney viscosity of the elastomer essentially constant.

The polyurethane elastomer of the instant invention can be cured to the same extent as known polyurethane elastomers but with less curative or can be brought to a higher degree of cure than possible with known polyurethane elastomers using the same amount of curative. In order to achieve this result, it is necessary to incorporate both the ethylenically unsaturated chain-terminating substance T and the urea linkage forming material U in the above-defined basic urethane elastomer. This result is unexpected in view of the fact that the ethylenically unsaturated chain-terminating substance T has no significant effect on the degree of cure attainable with the basic urethane elastomer in the absence of the urea linkage forming material U, and in view of the fact that the urea linkage forming material U has no significant effect on the degree of cure attainable with the basic urethane elastomer in the absence of the ethylenically unsaturated chain-terminating substance T. The stress at a given elongation or the "modulus" of a cured sample is indicative of the degree of cure of the same.

In order to process a polyurethane elastomer on conventional rubber machinery, it is necessary to employ a raw elastomer having a Mooney viscosity of from 40 to 80 ML-4 at 212° F. In the instant invention, it is possible both to attain such a Mooney viscosity and to obtain a high degree of cure by suitably adjusting the molar ratio of the chain-terminating substance T and the urea linkage forming material U. For example, the mole ratios of reagents needed to yield a raw polyurethane elastomer with a Mooney viscosity of 50 from an ethylenetetramethylene (60–40) adipate polyester of 1900 molecular weight are estimated to be as follows:

| Polyester | Diphenylmethane Diisocyanate | Methallyl Alcohol | Tonox |
|---|---|---|---|
| 1.00 | 1.37 | .26 | .15 |
| 1.00 | 1.27 | .16 | .10 |
| 1.00 | 1.225 | .12 | .075 |
| 1.00 | 1.18 | .08 | .05 |

¹ Tonox is 4,4'-diaminodiphenylmethane.

As a general rule, an increase in the amount of unsaturated chain-terminating substance T and urea linkage forming material U will result in a polyurethane elastomer which can be cured to a higher modulus with a given amount of curing agent. The raw polyurethane elastomers of the instant invention are unusually receptive to curing with peroxides, and particularly with dicumyl peroxide.

As pointed out above, the chain-terminating material T is a substance wherein the number of carbon atoms does not exceed 20, said substance containing only one group reactive with isocyanate and containing at least one ethylenic double bond, selected from the group consisting of primary alcohols, secondary aliphatic alcohols, and secondary aliphatic-aromatic alcohols.

Typical primary alcohols are allyl alcohol, methallyl alcohol, p-allyl benzyl, alcohol p-allyl benzyl carbinol, geraniol, decen-9-ol-1 [HO—CH₂—(CH₂)₇—CH=CH₂], hexadecen-17-ol-1, 2-chloro-propen-1-ol-3

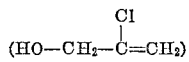

N,N-diallyl ethanolamine

[HO—CH₂—CH₂—N(CH₂—CH=CH₂)₂]

beta-allyloxy ethyl alcohol (HO—CH₂—CH₂—O—CH₂—CH=CH₂)

and its sulfur analogue (HO—CH₂—CH₂—S—CH₂—CH=CH₂)

methallyl delta-hydroxy-pentanoate

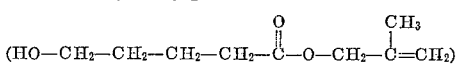

ethylene glycol monocrotonate

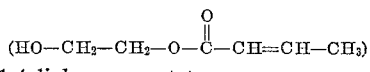

2-butene-1,4 diol mono acetate

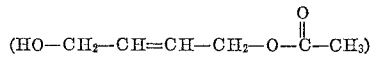

and propargyl alcohol. Typical secondary aliphatic alcohols are methyl vinyl carbinol, n-butyl vinyl carbinol, p-allylbenzyl methyl carbinol, allyl benzyl carbino, allyl p-vinylbenzyl carbinol, cyclohexyl vinyl carbinol, n-pentadecyl vinyl carbinol, and N,N' diallyl-2-hydroxypropyl-amine

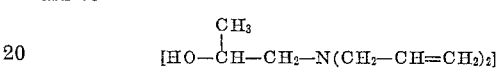

Typical secondary aliphatic-aromatic alcohols are phenyl vinyl carbinol, p-allylphenyl vinyl carbinol, p-allylphenyl methycarbinol

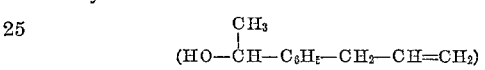

and p-methylphenyl vinyl carbinol. The quantity of the mono-functional ethylenically unsaturated chemical T to be used in the exercise of this invention is from 0.06 to 0.70 mole (per mole of polyester or polyether).

In the preparation of a polyurethane, chain-lengthening ordinarily takes place by condensation of diisocyanate with the terminal hydroxyl groups on either the original polyester (or polyether) chain or the other difunctional additives U described below. It is believed that in the polymer of this invention the growing polymer chain becomes blocked by reaction of a terminal isocyanate group with the —OH group of the described mono-functional unsaturated chemical with the result that such a blocked end of the molecule is incapable of further growth until the final curing step.

It is believed that a terminal grouping is introduced on the principal polyurethane chain by reason of the reaction between an isocyanate grouping, —NCO, on such chain and the mono-functional organic chemical T.

In general, the polymer of this invention is characterized by the fact that the polyurethane molecule is terminated at both ends by a structural unit that contains at least one ethylenic double bond and that contains only groups that are inert (i.e., non-reactive) toward isocyanate.

Considering in more detail the basic starting materials of the polyurethane elastomer, the polyester employed is substantially saturated and is typically an anhydrous polyester made from a saturated glycol, for example ethylene glycol, and an aliphatic saturated dicarboxylic acid or anhydride thereof, for example, adipic acid, using an excess of glycol over the acid so that the resulting polyester is substantially terminated with alcoholic hydroxyl groups. Such an amount of glycol is used as to give a polyester having a hydroxyl number of 112 to 28 and preferably 112 to 37, and a low acid number of less than 6 and preferably less than 2. The polyesters are substantially linear in type with melting point levels of 90° C. or lower. The molecular weight is within the range from 1000 to 4000 and preferably from 1000 to 3000. Many of the useful polyesters were obtained by a condensation reaction of one or more saturated alkyl dibasic acids or acid anhydrides and/or aryl dibasic acids or anhydrides with one or more saturated glycols. Thus, for example, good results have been obtained using polyethylenepropylene adipate, having a molecular weight between 1900 and 2000, formed by esterifying a mixture of ethylene glycol and propylene glycol in a mole ratio of 70 to 30, respectively, with adipic acid. Other examples of suitable polyesters are polyethylene adipate, polyethylene adipate (70)-phthalate (30), polyneopentyl sebacate, polydiethylene glycol adipate, polytriethylene glycol adipate, etc.

As an alternative to the polyesters just described there may be used one or more members of the class of elastomer-yielding polyethers. The polyethers would typically be an anhydrous chain-extended polyether possessing ether linkages (—O—) separated by hydrocarbon chains alkyl in nature. The ether contains terminal alcoholic hydroxyl groups reactive with isocyanate. The polyethers used are substantially linear in type with melting point levels of 90° C. or lower. The molecular weight of the polyethers is within the range of 500 to 3000 (i.e., hydroxyl number of about 225 to 37) and preferably within the range of 750 to 2500 (i.e., hydroxyl number of about 150 to 45). Examples of such polyethers are polyethylene glycol, polytrimethylene glycol, polytetramethylene glycol, polypentamethylene glycol, poly (2-ethyl 1,3-propylene) glycol, and poly (2-methyl 1,4-pentylene) glycol. In general, polyethers having the ether linkages thereof separated by linear alkyl hydrocarbon chains of from two to five carbon atoms can be employed.

As employed herein, the expression "linear" is intended to include bivalent aliphatic or aromatic radicals directly connecting the carbonyloxy groups of the polyester or oxygen atoms of the polyether, with or without non-functional lower alkyl side chains. In the case of polyethers, said non-functional lower alkyl side chains should be attached to a carbon atom other than the terminal carbon atoms of the bivalent radical. The expression "substantially hydroxy-terminated" is used herein to define polyethers and polyesters having an acid number of less than 6. When reference is made to a "substantially saturated" polyester or polyether, it is meant to denote a polyester or polyether having less than one mole percent of aliphatic unsaturation introduced by employing less than one mole of unsaturated glycol and/or unsaturated dibasic acid per 100 moles of glycol plus dibasic acid in the case of polyesters, and by employing less than one mole of unsaturated cyclic oxide per 100 moles of cyclic oxide in the case of polyethers. As employed herein, the expression "substantially linear" polyester or polyether is intended to include polyesters and polyethers having less than 0.5 mole percent of aliphatic branching with a functional group which is isocyanate, hydroxyl, or carboxylic acid reactive; introduced by employing, for example, less than 0.5 mole of a trifunctional alcohol and/or trifunctional carboxylic acid per 100 moles of polyhydric alcohol plus polybasic carboxylic acid in the case of polyesters, and by employing, for example, less than 0.5 mole of a trifunctional initiator (such as a triol) per 100 moles of cyclic oxide plus said trifunctional initiator in the case of polyethers.

The preferred polyesters or polyethers are completely saturated and completely linear in nature.

Polyether not only can be used in place of the polyester but can be used in conjunction with the polyester. There is included in the polyurethane elastomer preparation, in addition to the organic diisocyanate D, the polyester or polyether P, and the the unsaturated chemical T, a small amount of an agent capable of forming urea linkages in the polymer. In general, such urea linkage forming agents are materials capable of condensing with the diisocyanate to yield at least one ureylene group

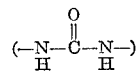

Although these agents should be at least bifunctional with respect to isocyanate, i.e., they should possess at least two available active hydrogen atoms, it is not necessary that these reactive groups be —NH₂ groups. They are believed to act by combining with available isocyanate groups on different molecules of the elastomer, or with available isocyanate groups on different parts of the same molecule of the elastomer thus increasing the chain length of the polymer. The bifunctional ureylene linkage forming agents are employed in an amount varying from 0.05 to 0.7 mole per mole of polyester or polyether used and preferably from 0.1 to 0.6 mole per mole of polyester or polyether. Examples of such reagents are (a) aromatic diamines such as p,p'-diaminodiphenyl methane, and p-phenylene diamine, (b) amino-phenols such as p-aminophenol, and m-aminophenol, (c) aliphatic diamines such as hexamethylenediamine, and tetramethylene diamine, (d) amino-alcohols such as ethanolamine, and p-aminobenzyl alcohol, and (e) water.

Any of a wide variety of conventional organic diisocyanates which are free of isocyanate-reactive groups may be employed. Such organic diisocyanates can be divided into the following sub-classes of (a) alkylene (b) arylene (c) aralkylene and (d) alkarylene diisocyanates. Examples of the subclasses are the alkylene diisocyanates such as 1,6-hexamethylene diisocyanate, 1,4-tetramethylene diisocyanate, 1,10-decamethylene diisocyanate, and including cycloalkylene diisocyanates, such as 1,4-cyclohexylene diisocyanate, and 4,4'-methylene-bis-(cyclohexyl isocyanate); the arylene diisocyanates such as m-phenylene diisocyanate, p-phenylene diisocyanate, p,p'-biphenyl diisocyanate, 1,5-naphthalene diisocyanate, 4-chloro-1,3-phenylene diisocyanate, and 1,5-tetrahydronaphthalene diisocyanate; aralkylene diisocyanates such as metaxylylene diisocyanate; and alkarylene diisocyanates such as 2,4-toluene diisocyanate, and p,p'-diphenylmethane diisocyanate.

Although the above organic diisocyanates are essentially free from aliphatic unsaturation, the invention contemplates the use of, for example, less than 10 moles of aliphatically unsaturated organic diisocyanate per 100 moles of total organic diisocyanate, which would introduce approximately the same amount of aliphatic unsaturation into the urethane polymer as if a polyester or polyether having less than one mole percent aliphatic unsaturation were employed. It is important to observe that the maximum amount of unsaturated polyester or polyether can be employed only if the organic diisocyanate is completely saturated and vice versa.

Furthermore, by employing the expression "diisocyanate" it is not intended to exclude the use of small amounts of trifunctional or higher functional isocyanates which will introduce some chain branching into the raw polymer. In such a case, an equivalent amount of diisocyanate is replaced by such a polyisocyanate. The instant invention contemplates the use of, for example, less than 5 moles of organic triisocyanate per 100 moles of diisocyanate plus triisocyanate, which would introduce approximately the same amount of chain branching into the urethane polymer as if a polyester or polyether having less than 0.5 mole percent chain branching were employed. Again, it is important to keep in mind that the maximum amount of such trifunctional isocyanate can be employed only if the polyester or polyether is completely linear and vice versa. A typical trifunctional isocyanate would be p,p',p''-triphenylmethane triisocyanate.

The preferred diisocyanates are arylene and alkarylene diisocyanates which are completely saturated and which do not contain even small amounts of trifunctional or higher functional isocyanates.

The amount of isocyanate employed ranges from 1.00 to 1.25 equivalents for each equivalent of available isocyanate-reactive groups in the polyester or polyether P, mono-functional unsaturated chemical T, and urea linkage forming agent U. The exact excess of isocyanate depends upon the tendency of the particular isocyanate used to undergo side reactions, such as dimerization and trimerization, at the temperature at which the polyurethane elastomer is prepared. The instant invention employs from 1.08 to 2.44 moles of organic diisocyanate D per mole of polyester or polyether P.

The diisocyanate as used functions as a chain lengthening chemical, and by its reactions incorporates urethane and urea groups into the polymer chain both of which enhance the rubbery properties of the raw and cured material when the mono-functional unsaturated chemical T is also employed.

In some cases, it is desirable to accelerate or promote the reaction between the diisocyanate and the polyester or polyether, and this may be done with the aid of certain catalytic materials. Known catalysts for this reaction include the soluble heavy metal salts, and the tertiary amines. Examples of such catalysts are cobalt naphthenate, ferric acetylacetonate, and diethylcyclohexylamine.

The reaction of the polyester or polyether with the diisocyanate and with the mono-functional unsaturated chemical is carried out under essentially moisture-free conditions. It will be understood that in a given preparation more than one polyester, with or without one or more polyether, or more than one diisocyanate, or more than one mono-functional unsaturated organic chemical, or more than one urea linkage former, may be used, if desired.

The mono-functional unsaturated chemical T is ordinarily added to the initial mixture of diisocyanate D with the polyester or polyether P at the commencement of the process, but it may also be added entirely or in part after some reaction between the diisocyanate and the polyester or polyether has taken place. The unsaturated material T may be added continuously, or in increments if so desired, as may the polyester and the diisocyanate, particularly if it is desired to carry out the process continuously or semi-continuously. The above reaction is generally carried out at a temperature of from 50° to 150° C.

It is also understood that the above ingredients may be added in varying sequence. The mono-functional unsaturated organic chemical T may be added to the diisocyanate D and reacted with it (at a temperature of from 50° to 150° C.) prior to addition of the so-produced reaction product or adduct to the polyester or polyether P.

The mono-functional unsaturated organic chemical T may be incorporated into the ingredients in making up the polyester during esterification at temperatures common in the preparation of alkyds (for example, at a temperature of from 100° to 250° C.). That is to say, the polyester may, in effect, be prepared "in situ" in the presence of the mono-functional unsaturated chemical T, to produce a polyester modified by that mono-functional unsaturated chemical. In other words, the mono-functional unsaturated organic chemical is added to the polyester-forming materials, i.e., to the mixture of glycol and dibasic acid or anhydride, which is then heated to prepare the modified polyester in a conventional manner. The unsaturated chemical T becomes chemically combined with the polyester as a result of this procedure. It should be noted that in the preparation of the modified polyester, the terminating unsaturated chemical T contains only one group reactive with carboxylic acids and anhydrides thereof. The reaction product so formed will be characterized by terminal unsaturation on the modified polyester. It is important to note that incorporation of the mono-functional unsaturated chemical in this manner during the preparation of the polyester does not lead to internally unsaturated materials, that is, the mono-functional chemical terminates the material to which it is attached. This reaction product is in turn reacted at a temperature of from 50° to 150° C. with the diisocyanate, with or without additional polyether or unmodified polyester. In this procedure there is employed from 1.0 to 1.25 equivalents of isocyanate for each equivalent of isocyanate-reactive groups in the modified polyester and the subsequently-added urea linkage forming agent U.

It should be noted that in any case the diisocyanate is added after the polyether-forming ingredients have been reacted or after the polyester-forming ingredients have been reacted, either alone or with the unsaturated chemical T. It should also be made clear that the urea linkage forming agent U is added after the reaction of P, D, and T is substantially complete.

In general, the preparation of the raw urethane polymer is suitably carried out in a mixing vessel capable of handling viscous or gum-like materials, such as a Baker-Perkins or similar internal mixer, and the final product typically has the appearance and viscosity of a raw gum rubber. If it is desired to process the raw urethane polymer on conventional rubber machinery, the Mooney viscosity (ML-4 at 212° F.) of the polymer should be from 40 to 80. As stated above, the reaction is generally carried out at a temperature of from 50° to 150° C. A preferred temperature for this reaction is from 80° to 120° C.

This invention provides a positive and effective means of providing a non-isocyanate curing site, i.e., an ethylenic double bond, at the end of the polymer chains. One of the benefits of the fact that essentially all of the unsaturation is terminal is that the resultant polyurethane elastomer when cured has superior ozone resistance. Ozone degradation of elastomers is believed to be due to chain scission brought about by ozone attack at the points of aliphatic unsaturation. When this unsaturation is distributed randomly along the chain, as in the case of most conventional rubbers, a relatively small amount of reaction with ozone reduces the molecular weight, i.e., degrades the rubber, appreciably. For example, where an ethylenic double bond exists at the center of the chain, a single scission reaction will reduce the molecular weight by 50%. In the instant invention, if any residual unsaturation exists after cure, it will be only at the ends of the polymer chains and scission at these points will have little or no effect on the molecular weight. Hence ozone will not degrade the polymers of this invention to any appreciable extent.

The urethane polymers of the instant invention are characterized by having the following structure:

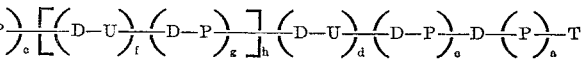

wherein $a$ is an integer selected from the group consisting of zero and one; $b$, $c$, $d$ and $e$ are integers including zero; $f$, $g$ and $h$ are integers greater than zero; where $a$ is zero, P is the polymeric residue remaining after removal of the hydrogen atoms from the terminal groups of a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; where $a$ is one, P is the polymeric residue remaining after removal of the hydrogen atoms from the terminal groups of a substantially linear, substantially saturated, substantially hydroxy-terminated polyester having a molecular weight of from 1000 to 4000 and an acid number of less than 6 obtained by the esterification of a material selected from the group consisting of dicarboxylic acids and anhydrides thereof with a glycol; D is the radical remaining after addition of hydrogen atoms to the isocyanate groups of an organic diisocyanate free of isocyanate-reactive groups; T is the radical remaining after removal of the active hydrogen atom from a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; U is the radical remaining after removal of at least two active hydrogen atoms from a urea linkage former containing at least two active hydrogen atoms selected from the group consisting of diamines, water, amino-alcohols, and amino-phenols; the proportions being as follows: P 1.0 mole; T 0.06 to 0.7 mole; U 0.05 to 0.6 mole.

The preceding structural formula is characteristic of the urethane polymers of the instant invention, regardless of the method employed in their preparation. If the urethane polymer of the invention is prepared by a method other than that wherein a modified or "in situ" polyester is employed, such urethane polymers will be characterized by the following formula:

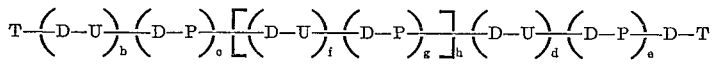

wherein $b$, $c$, $d$ and $e$ are integers including zero; $f$, $g$ and $h$ are integers greater than zero; P is the polymeric residue remaining after removal of the hydrogen atoms from the terminal groups of a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; D is the radical remaining after addition of hydrogen atoms to the isocyanate groups of an organic diisocyanate free of isocyanate-reactive groups; T is the radical remaining after removal of the active hydrogen atom from a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; U is the radical remaining after removal of at least two active hydrogen atoms from a urea linkage former containing at least two active hydrogen atoms selected from the group consisting of diamines, water, amino-alcohols, and amino-phenols; the proportions being as follows: P 1.0 mole; T 0.06 to 0.7 mole; U 0.05 to 0.6 mole.

It has been found that the raw polyurethane elastomers of the instant invention can be cured or vulcanized to yield products having desirable properties not found in isocyanate cured polyurethane elastomers, specifically these vulcanizates reach a stable state of cure during a short cure cycle and do not show the slow continual change in physical properties for the first 2–14 days after molding that is characteristic of isocyanate-cured polyurethanes. It has been discovered that particularly effective curing agents for the improved polyurethane elastomers of the invention are the ditertiary-alkyl peroxides and dicumyl peroxide as disclosed in my application Ser. No. 604,064 filed Aug. 15, 1956 (now abandoned). Other known curatives, such as tertiary butyl perbenzoate, can also be employed in the instant invention. To effect a cure of the raw polyurethane elastomer, it is typically mixed with from about one to about ten parts by weight of the peroxide (per 100 parts of the raw elastomer) on a rubber mill or in any other suitable equipment. The vulcanizable mix may include any desired suitable accessory compounding ingredients including carbon black or other fillers (e.g., asbestos, blanc fixe, clay, iron oxide, lithopone, mica, siliceous materials, titanium dioxide, whiting, flock, etc.). The compounded stock may be calendered, extruded, molded, or otherwise shaped or processed in much the same manner as ordinary rubber stocks. The stocks are cured with the aid of heat. Thus, heating the stock at a temperature of, for example, from about 120° to 180° C. in a closed mold will usually vulcanize the stock sufficiently for ordinary purposes within a reasonable or convenient period of time.

The improved curing characteristics of the present polyurethane elastomer, especially in conjunction with the described special class of organic peroxides, is believed to be a consequence of the terminal ethylenically unsaturated grouping introduced by the mono-functional unsaturated chemical. It is believed that the special unsaturated reagent of the class described provides unsaturated carbon-to-carbon double bonds at chain ends of the raw polymer complex which are very susceptible to cross-linking reactions when initiated by free radicals released by the chosen organic peroxide during the vulcanization. In order to obtain such curing characteristics, it is necessary that the urea linkage former be incorporated in the polymer chain.

The following examples, in which all parts are expressed by weight or mole-weight, will serve to illustrate the practice of the invention in more detail.

Example 1

To 462 parts (0.25 mole) of anhydrous polyethylene (70) propylene (30) adipate heated to 95° C. is added 103 parts (0.41 mole) of diphenylmethane diisocyanate and 10 parts (0.14 mole) of methylvinyl carbinol while the mixture is efficiently stirred in a Brabender plastograph internal mixer. After continuous stirring at a uniform temperature of 90° C. for about 100 minutes, the reaction had advanced substantially to completion, and the resulting prepolymer was a viscous paste. Fifteen parts (0.075 mole) of p,p'-diaminodiphenylmethane was then added to the prepolymer, the temperature was raised to 115° C., and the mixing was continued for five to ten minutes. The raw rubbery polymer containing ureylene linkages thereby attained was found to have a Mooney viscosity or plasticity of over 150 (ML–4/100° C.).

The raw polymer was then mixed with 4.0 parts, per 100 parts of raw elastomer, of 50% dicumyl peroxide (in the form of a solution in an inert solvent) on a rubber mill at a temperature not over 110° C. The mix was then vulcanized in a platen mold to a thickness of approximately 0.1 inch for forty-five minutes at a temperature of 145° C. Table 1 shows the more important physical properties of the vulcanizate as determined by well established and standardized test methods known and used in the rubber industry.

TABLE 1

| | |
|---|---|
| Hardness (Shore Durometer A) | 50 |
| Tensile strength, p.s.i. | 2720 |
| Elongation at break, percent | 470 |
| Stress at 100% elongation, p.s.i. | 345 |
| Stress at 200% elongation, p.s.i. | 710 |
| Stress at 300% elongation, p.s.i. | 1230 |

EXAMPLE 2

Example 1 was repeated, using the same type of polyester, along with various diisocyanates and various mono-functional unsaturated organic compounds as set forth in Table 2 below, which also shows the proportions of these materials and the conditions of the reaction. In the first stage the reaction between the polyester, diisocyanate, and mono-functional unsaturated organic compounds was catalyzed with 0.1 part of cyclohexyldiethylamine. The resulting prepolymer was reacted with p,p'-diaminodiphenylmethane in the amount shown and under the conditions shown in Table 2.

Two parts of dicumyl peroxide were added to 100 parts of the resulting elastomer, and samples of the product were cured for 45 minutes at a temperature of 145° C. The properties of the resulting vulcanizates are set forth in the last portion of Table 2.

TABLE 2

Step a. Preparation of polyurethane

| Code | 2-A | 2-B | 2-C | 2-D |
|---|---|---|---|---|
| Parts of polyester | 462 | 363 | 342 | 400 |
| Molecular weight | 1,850 | 1,815 | 1,710 | 2,000 |
| Moles | .25 | .20 | .20 | .20 |
| Diisocyanate: | (¹) | (²) | (³) | (¹) |
| Parts | 106.3 | 47.1 | 42.9 | 66 |
| Moles | .425 | .29 | .27 | .26 |
| Mono-functional unsaturated organic chemical: | (⁴) | (⁴) | (⁴) | (⁵) |
| Parts | 11.52 | 2.31 | 4.89 | 1.75 |
| Moles | .16 | .036 | .067 | .031 |
| Temperature, ° C | 95 | 90 | 90 | 90 |
| Time of Heating, min | 61 | 80 | 104 | 155 |

Step b. Modification with ureylene linkage forming agent

| p,p'-Diaminodiphenylmethane: | | | | |
|---|---|---|---|---|
| Parts | 15 | 12 | .6 | 6 |
| Moles | .075 | .06 | .03 | .03 |
| Temperature, ° C | 115 | 115 | 115 | 116 |
| Mooney Viscosity of Polymer (ML-4/212° F.) | 58 | >150 | 70 | 76 |
| Mooney Viscosity after 8 mos. Shelf Aging (ML-4/212° F.) | | | 68 | |
| Physical Properties of Vulcanizate: | | | | |
| Hardness (Shore Durometer A) | 53 | 41 | 50 | 50 |
| Tensile Strength (p.s.i.) | 2,330 | 2,760 | 2,430 | 4,000 |
| Elongation at break (percent) | 430 | 680 | 450 | 650 |
| Stress at 100% elongation (p.s.i.) | 375 | 155 | 235 | 175 |
| Stress at 200% elongation (p.s.i.) | 765 | 240 | 440 | 270 |
| Stress at 300% elongation (p.s.i.) | 1,250 | 330 | 785 | 380 |

¹ Diphenylmethane.
² Hexamethylene.
³ p-Phenylene.
⁴ Methyl vinyl carbinol.
⁵ Propargyl alcohol.

EXAMPLE 3

Example 2A was repeated, except that the monofunctional unsaturated organic chemical employed in the first stage was geraniol (19.7 parts, .129 mole), and the reaction was carried out for a period of 37 minutes at a temperature of 115° C. In the second stage, p,p'-diaminodiphenylmethane was again used as the urea linkage forming agent, in the amount of 12 parts (0.06 mole), to obtain an elastomer having a Mooney viscosity in excess of 150 (ML-4/100° C.) after curing for 45 minutes at 145° C. with 4 parts of dicumyl peroxide (per 100 parts of raw elastomer), the stock had a hardness of 52, a tensile strength of 2370 p.s.i., and an elongation at break of 470%. The stress at 300% elongation was 1135 p.s.i., while the torsional hysteresis was 0.076 at room temperature, and 0.037 at 138° C. The tear strength of the product was 5.1 lbs./0.1 inch.

EXAMPLE 4

In this example, various bifunctional urea linkage forming agents were employed in the second stage of the reaction. The whole process, including the physical properties of the final vulcanizate, is summarized in Table 4. Polyethylenepropylene adipate, diphenylmethanediisocyanate, diethylcyclohexylamine as the catalyst, and methyl vinyl carbinol as the mono-functional unsaturated organic chemical were used throughout.

TABLE 4

| | 4-A | 4-B | 4-C | 4-D |
|---|---|---|---|---|
| Polyester: | | | | |
| Parts | 363 | 363 | 363 | 396 |
| Molecular Weight | 1,815 | 1,815 | 1,815 | 1,800 |
| Moles | .20 | .20 | .20 | .22 |
| Diisocyanate: | | | | |
| Parts | 73 | 100 | 85 | 60 |
| Moles | .29 | .40 | .34 | .24 |
| Mono-functional unsaturated organic chemical: | (¹) | (¹) | (¹) | (¹) |
| Parts | 2.31 | 9.22 | 2.31 | 0.71 |
| Moles | .032 | .127 | .032 | .01 |
| Catalyst: Parts | 0.1 | 0.1 | 0.1 | 0.1 |
| Temp. during 1st step, ° C | 90 | 90 | 90 | 95 |
| Time of 1st step, min | 47 | 35 | 40 | 120 |
| Source of urea links | (²) | (³) | (⁴) | (⁵) |
| Parts | 3.66 | 2.16 | 6.6 | |
| Moles | .06 | .12 | .063 | |
| Mooney ML-4/100° C. viscosity | >150 | 18 | >150 | 13 |
| Dicumyl perox. add'd., phr | 2 | 2 | 6 | 2 |
| Time of cure, min | 45 | 45 | 45 | 45 |
| Temp. of cure, ° C | 144 | 144 | 144 | 145 |
| Physical Properties of Vulcanizate: | | | | |
| Shore Duro. A Hardness | 40 | 40 | 52 | 34 |
| Scott Tensile, p.s.i. | 2,780 | 1,390 | 1,090 | 1,520 |
| Scott Elongation at break, percent | 650 | 520 | 370 | 760 |
| Autographic stress, p.s.i. at— | | | | |
| 100% elongation | 160 | 160 | 240 | 105 |
| 200% elongation | 225 | 290 | 430 | 145 |
| 300% elongation | 300 | 490 | 780 | 180 |

¹ Methyl vinyl carbinol.
² Beta-aminoethanol.
³ Water.
⁴ p-Aminophenol.
⁵ None.

As shown in Example 4-D, the use of an unsaturated mono-functional terminating chemical T without the concurrent use of a urea linkage former U does not result in a satisfactory cured product as indicated by modulus.

EXAMPLE 5

A portion of stock 2-A of Example 2 was mixed with 20 parts (per 100 parts of raw elastomer) of carbon black (Philblack O) prior to the cure. The relative physical properties, with and without the carbon black, are shown in the following Table 5.

TABLE 5

| Stock Code | 5-A | 5-B |
|---|---|---|
| High abrasion furnace black (parts) | 0 | 20 |
| Hardness (Shore Durometer A) | 53 | 59 |
| Tensile strength, p.s.i. | 2,330 | 1,900 |
| Elongation at break, percent | 430 | 440 |
| Stress at 100% elongation, p.s.i. | 375 | 550 |
| Stress at 200% elongation, p.s.i. | 765 | 1,125 |
| Stress at 300% elongation, p.s.i. | 1,250 | 1,660 |

EXAMPLE 6

In this example, further preparations were made using different polyesters, as summarized in Table 6 below.

TABLE 6

Step (a)

| Stock | 6-A | 6-B | 6-C |
|---|---|---|---|
| Polyester or Polyether | (¹) | (²) | (³) |
| Molecular Weight | 2,010 | 1,860 | 3,110 |
| Parts | 402 | 372 | 413 |
| Moles | .20 | .20 | .133 |
| p,p'-Diphenylmethane diisocyanate: | | | |
| Parts | 70 | 70 | 52 |
| Moles | .28 | .28 | .21 |
| Methylvinyl carbinol: | | | |
| Parts | 4.9 | 4.89 | 6.14 |
| Moles | .068 | .068 | .085 |
| Cobalt naphthenate, parts | 0.1 | | |
| Diethylcyclohexylamine, parts | | 0.1 | 0.1 |
| Temperature curing 1st Step, ° C | 90 | 90 | 90 |
| Time of 1st Step, min | 90 | 30 | 140 |

See footnotes at end of table.

TABLE 6—Continued

Step (b)

| Stock | 6-A | 6-B | 6-C |
|---|---|---|---|
| p,p'-Diaminodiphenylmethane: | | | |
| Parts | 6.0 | 6.0 | 4.0 |
| Moles | .03 | .03 | .02 |
| Temperature at start of addition, °C | 115 | 115 | 115 |
| Mooney visc., ML-4/100° C., raw polymer | 83 | 60 | 27 |
| Dicumyl perox. addition, phr | 2 | 2 | 2 |
| Temp. of cure, °C | 144 | 144 | 144 |
| Time of cure, min | 45 | 45 | 45 |
| Physical Properties of Vulcanizate: | | | |
| Shore Duro. A Hardness | 40 | 51 | 46 |
| Scott Tensile, p.s.i. | 1,130 | 1,910 | 2,030 |
| Scott Elongation at break, percent | 730 | 560 | 690 |
| Autographic Stress, p.s.i. at— | | | |
| 100% Elongation | 135 | 215 | 180 |
| 200% Elongation | 215 | 355 | 255 |
| 300% Elongation | 315 | 560 | 350 |

[1] Polytriethylene glycoladipate.
[2] Polyethylene adipate (70), phthalate (30).
[3] Polytetramethylene glycol.

EXAMPLE 7

This example illustrates the preparation of an elastomer of the invention having, in addition to the essential terminal unsaturation, less than one mole percent of aliphatic unsaturation in the chain as previously defined. It is not desirable to introduce more than one mole percent of chain aliphatic unsaturation in this way, because the polymer then tends to become stiff due to overcuring, and it is subject to attack by ozone which causes degradation. The following polyester contains approximately 0.8 mole percent of aliphatic unsaturation.

TABLE 7

Step (a)

Stock:
    Polyester used [1]—
        Molecular wt. _____ 2490
        Parts _____ 373
        Moles _____ .15
    p,p'-Diphenylmethane diisocyanate—
        Parts _____ 49.5
        Moles _____ .198
    Methallyl alcohol—
        Parts _____ 1.73
        Moles _____ .024
    Diethylcyclohexylamine—
        Parts _____ .2
    Temperature during 1st step, °C. _____ 90
    Time of 1st step, min. _____ 110

Step (b)

p,p'-Diamino diphenylmethane:
    Parts _____ 4.5
    Moles _____ .023
    Temperature at start of add'n, °C. _____ 115
    Mooney visc., ML-4 100° C. raw polymer ___ >150
    Dicumyl peroxide, phr. _____ 2
    Temp. of cure, °C. _____ 150
        Time of cure, min. _____ 60

Physical properties of vulcanizate

Durometer A Hardness _____ 50
Scott tensile, p.s.i. _____ 3210
Scott elongation at break _____ 570
Autographic stress, p.s.i.—
    At 100% elongation _____ 185
    At 200% elongation _____ 295
    At 300% elongation _____ 470

[1] Polyethylene-propylene-2-butene-1,4-diol (70-30-1.6) adipate.

EXAMPLE 8

This example illustrates the reaction of the mono-functional organic chemical with the polyester forming ingredients prior to addition of the diisocyanate.

46 g. of methyl vinyl carbinol were reacted for 2 hours with 32 g. of succinic anhydride in 25 cc. of refluxing benzene. This reaction product was added to a mixture of 477.4 g. of ethylene glycol, 250.8 g. of propylene glycol and 1460 g. of adipic acid dissolved in 100 cc. of benzene. The mixture was refluxed under nitrogen for 37 hours, the water being removed as it is formed. The benzene was then removed under vacuum. The final reaction product had a hydroxyl No. of 33.4; acid No. 1.1; and iodine No. 1.83; molecular weight of 2920. As evidenced by the iodine number, about 10 g. of methyl vinyl carbinol reacted.

197 g. of the modified polyester so prepared was mixed with 197 g. of an unmodified polyester prepared from ethylene glycol, propylene glycol, and adipic acid. This unmodified, second polyester was prepared in the usual fashion, and had a molecular weight of 1985.

394 g. of the above mixture of unmodified polyester and modified polyester was reacted at 95° C. with 48.8 g. of diphenyl methane diisocyanate and subsequently with 6 g. of p,p'-diamino diphenyl methane. The raw polymer thus obtained had a Mooney viscosity of 37 ML-4/100° C.

100 parts of the above raw polymer was mixed with 8 parts of 40% dicumyl peroxide and cured for 60 minutes at 150° C. The cured stock so obtained had the following physical properties:

Durometer A hardness _____ 41
Autographic stress strain, p.s.i.—
    At 100% elongation _____ 130
    At 200% elongation _____ 240
    At 300% elongation _____ 390
Scott tensile, p.s.i. _____ 1700
Scott elongation at break, percent _____ 490

EXAMPLE 9

This example illustrates the reaction of the mono-functional unsaturated organic chemical with the polyester-forming ingredients prior to the addition of the diisocyanate wherein the relative amounts of the ingredients of the modified polyester are adjusted so as to produce a material satisfactory in all respects without adding unmodified polyester as described in Example 8.

37 g. of geraniol was reacted under esterifying conditions with 439 g. of ethylene glycol, 230 g. of propylene glycol and 1364 g. of adipic acid in the presence of 100 ml. of benzene, the water being removed as it is formed and the benzene recycled, to produce a reaction product having a molecular weight of about 1700 and an acid number of less than 2.

347 g. of the above reaction product, after removal of the benzene under vacuum, was reacted with 35.8 g. of p-phenylene diisocyanate at 95° C. for 1 hour, and subsequently reacted with 5.9 g. of p,p'-diaminodiphenyl methane to obtain a rubbery raw polymer.

2 parts of dicumyl peroxide were added to 100 parts of the above raw polymer, and samples were cured for 45 minutes at 145° C. The properties of the resulting vulcanizate were essentially equivalent to those obtained with the vulcanizate of Example 2-C.

If a low boiling mono-functional unsaturated organic chemical T is used in conjunction with a glycol and a dibasic acid, there is a possiblity that appreciable amounts of organic chemical T may be carried off with water when the water is removed during esterification. In this event, the distilled water and organic chemical T may be continuously condensed and separated (by a salting-out or selective-solvent operation if necessary), with the organic chemical T being returned to the reaction vessel. Alternatively, one may estimate the loss of organic chemical T due to its volatility and compensate accordingly.

EXAMPLE 10

In this example, the mono-functional unsaturated organic chemical was reacted with the diisocyanate prior to further reaction with the polyester.

2.3 grams of methallyl alcohol was reacted with 66 g. of diphenyl methane diisocyanate for 16 hours at 45° C. The initial mixture of the two materials was non-homogeneous, but as the reaction progressed, a more homogeneous material was obtained. The final product was a completely homogeneous liquid.

68.3 grams of the above reaction product was reacted with 400 g. of ethylene propylene (70–30) adipate having a molecular weight of 1985, and 6 g. of p,p'-diaminodiphenylmethane at a temperature of 115° C.

The raw polymer thus obtained had a Mooney viscosity of 97 ML-4/100° C.

100 parts of the above raw polymer was mixed with 4 parts of 40% dicumyl peroxide and cured for 60 minutes at 150° C. The cured stock so obtained had the following physical properties:

Durometer A Hardness _____ 54
Autographic stress-strain, p.s.i.—
  At 100% elongation _____ 215
  At 200% elongation _____ 300
  At 300% elongation _____ 425
Scott tensile, p.s.i. _____ 3710
Scott elongation at break, percent _____ 600

EXAMPLE 11

In this example, the use of various curing agents is illustrated.

A raw polymer was made by reacting 363 g. (0.20 mole) of anhydrous polyethylene (70)-propylene (30) adipate, having a molecular weight of 1815, with 70 g. (0.28 mole) of p,p'-diphenylmethane diisocyanate and 4.89 g. (0.068 mole) of methylvinyl carbinol for one hour and a half at 95° C. The above reaction product was then reacted with 5.86 g. (0.03 mole) of p,p'-diaminodiphenylmethane. The resulting raw polymer had a Mooney viscosity (ML-4 at 100° C.) of 16.

The properties of the resulting vulcanizates, cured with 2 parts of curative per 100 parts of raw polymer for 45 minutes at 140° C., are set forth in the following table.

TABLE 11

| | 11-A | 11-B | 11-C | 11-D |
|---|---|---|---|---|
| Curative | (1) | (2) | (3) | (4) |
| Shore Duro. A Hardness | 45 | 45 | 40 | 25 |
| Scott tensile, p.s.i. | 2,000 | 1,925 | 1,500 | 150 |
| Autographic stress, p.s.i. at— | | | | |
| 100% Elongation | 235 | 170 | 195 | 120 |
| 200% Elongation | 415 | 310 | 350 | 170 |
| 300% Elongation | 645 | 475 | 550 | 180 |
| Torsional Hysteresis at 280° F. | .035 | .050 | .043 | (5) |

1 50% dicumyl peroxide.
2 2,2-bis(tertiary butyl peroxy) butane.
3 Tertiary butyl perbenzoate.
4 None.
5 Plastic.

EXAMPLE 12

Further samples of the raw polymer of Example 1 were cured at varying levels of dicumyl peroxide with the results as reported in the following table.

TABLE 12

| | 12-A | 12-B | 12-C |
|---|---|---|---|
| Dicumyl peroxide, phr | 0.0 | 0.5 | 1.0 |
| Scott tensile, p.s.i. | | 1790 | 2380 |
| Scott Elongation, percent | | 740 | 580 |
| Scott Set | | .55 | .23 |
| Durometer A | 27 | 40 | 45 |
| Autog. S.S., p.s.i. at— | | | |
| 100% elong | 125 | 220 | 265 |
| 200% elong | 270 | 445 | 545 |
| 300% elong | | 685 | 880 |

EXAMPLE 13

Further samples of the raw polymer of Example 2-A were cured at varying levels of dicumyl peroxide with the results as reported in the following table.

TABLE 13

| | 13-A | 13-B |
|---|---|---|
| Dicumyl peroxide, phr | 1.0 | 3.0 |
| Scott tensile, p.s.i. | 1,880 | 2,090 |
| Scott Elongation, percent | 650 | 400 |
| Scott Set | .45 | .10 |
| Durometer A | 45 | 52 |
| Autog. S.S., p.s.i. at— | | |
| 100% elong | 260 | 415 |
| 200% elong | 525 | 855 |
| 300% elong | 780 | 1,470 |

EXAMPLE 14

Further samples of the raw polymer of Example 3 were cured at varying levels of dicumyl peroxide with the results as reported in the following table.

TABLE 14

| | 14-A | 14-B | 14-C | 14-D |
|---|---|---|---|---|
| Dicumyl peroxide, phr | 1.0 | 2.0 | 3.0 | 4.0 |
| Scott Tensile, p.s.i. | 925 | 1,350 | 1,720 | 2,370 |
| Scott Elongation, percent | 660 | 700 | 720 | 470 |
| Scott Set | .57 | .52 | .55 | .12 |
| Durometer A | 42 | 44 | 44 | 52 |
| Autog. S.S., p.s.i. at— | | | | |
| 100% elong | 215 | 225 | 240 | 335 |
| 200% elong | 405 | 435 | 470 | 660 |
| 300% elong | 550 | 620 | 700 | 1,135 |

EXAMPLE 15

A raw polymer was made by reacting 380 g. of anhydrous polyethylene (70)-propylene (30) adipate, having a molecular weight of 1880, with an adduct of 68.6 g. of p,p'-diphenylmethane diisocyanate and 3.5 g. of methallyl alcohol. The adduct was prepared by reacting the ingredients for one hour at 70° C. The product of the polyester and adduct is then reacted with 6.0 g. of p,p'-diaminodiphenylmethane. The resulting raw polymer had a Mooney viscosity (ML-6 at 100° C.) of 66.

The properties of the resulting vulcanizates, cured for one hour at 1500° C. with varying amounts of dicumyl peroxide 40C (40%), were as set forth in the following table.

TABLE 15

| | 15-A | 15-B | 15-C |
|---|---|---|---|
| Dicumyl peroxide (40%), phr | 4 | 6 | 8 |
| Scott Tensile, p.s.i. | 3,010 | 2,780 | 2,150 |
| Elongation, percent | 520 | 400 | 360 |
| Set | .07 | .05 | .05 |
| Durometer A | 52 | 57 | 57 |
| Autog. S.S., p.s.i. at— | | | |
| 100% Elong | 240 | 300 | 335 |
| 200% Elong | 425 | 575 | 685 |
| 300% Elong | 760 | 1,200 | |

EXAMPLE 16

The procedure set forth in Example 15 was repeated with identical proportions and reactants except that 2.82 g. of allyl alcohol was substituted for the methallyl alcohol. The Mooney viscosity of the resulting raw polymer was 36 (ML-6 at 100° C.).

The properties of the resulting vulcanizates were as set forth in the following table.

TABLE 16

| | 16-A | 16-B | 16-C |
|---|---|---|---|
| Dicumyl peroxide (40%), phr | 4 | 6 | 8 |
| Scott tensile, p.s.i. | 2,330 | 1,820 | 1,550 |
| Elongation, percent | 460 | 380 | 330 |
| Set | | | .03 |
| Durometer A | 51 | 54 | 56 |
| Autog. S.S., p.s.i. at— | | | |
| 100% Elong | 210 | 275 | 310 |
| 200% Elong | 400 | 510 | 650 |
| 300% Elong | 750 | | |

EXAMPLE 17

This example illustrates that the addition of a urea linkage former U has no significant effect on the degree of cure attainable with a polyurethane elastomer which has not been chain-terminated with a mono-functional substance but rather is terminated with glycol.

The polyester employed was polyethylene-propylene (70–30) adipate having a molecular weight of 1980. The raw polymer was cured with varying amounts of dicumyl peroxide (40%) at 150° C. for 60 minutes.

TABLE 17

|  | 17-A | 17-B | 17-C | 17-D |
|---|---|---|---|---|
| Polyester: |  |  |  |  |
| Grams | 421 | 421 | 95 | 95 |
| Mole Ratio | 1.00 | 1.00 | 1.0 | 1.0 |
| MDI:[1] |  |  |  |  |
| Grams | 56.5 | 56.5 | 11.8 | 11.8 |
| Mole Ratio | 1.06 | 1.06 | 1.035 | 1.035 |
| Tonox:[2] |  |  |  |  |
| Grams | 7.5 | 7.5 |  |  |
| Mole Ratio | .17 | .17 |  |  |
| Dicumyl peroxide (40%), phr | 4 | 8 | 4 | 8 |
| Scott Tensile, p.s.i. | 1,410 | 2,280 | 2,630 | 3,030 |
| Elongation, percent | 770 | 520 | 740 | 480 |
| Set | .27 | .09 | .17 | .06 |
| Durometer A | 28 | 38 | 38 | 48 |
| Autog. S.S., p.s.i. at— |  |  |  |  |
| 100% Elong | 70 | 130 | 80 | 180 |
| 200% Elong | 110 | 250 | 125 | 300 |
| 300% Elong | 175 | 425 | 175 | 420 |

[1] MDI is p,p'-diphenylmethane diisocyanate.
[2] Tonox is p,p'-diaminodiphenylmethane.

As seen above, Examples 17–A and 17–B which contain a urea linkage former fail to shown any superiority in cured properties as compared to Examples 17–C and 17–D which do not contain a urea linkage former.

EXAMPLE 18

This example illustrates that, when a mono-functional *saturated* terminating chemical (n-propyl alcohol) and a urea linkage former are employed in a formulation analogous to that of the present invention, an increase in the amounts of mono-functional saturated terminating chemical and urea linkage former has no significant effect on the cured properties of the vulcanzate. This appears to be true even though different urea linkage formers are employed in varying amounts thereby illustrating that the urea linkage formers have no significant effect on the cured modulus of the vulcanizates which contain a saturated mono-functional terminating group.

The polyester employed was polyethylene-propylene (70–30) adipate having a molecular weight of 1880. The raw polymer was prepared by reacting the above polyester with an adduct of n-propyl alcohol and p,p'-diphenylmethane diisocyanate. The adduct was formed by reacting the ingredients thereof for one hour at 70° C. The raw polymer obtained was cured with varying amounts of dicumyl peroxide (40%) at 150° C. for 60 minutes.

TABLE 18

|  | 18-A | 18-B | 18-C | 18-D |
|---|---|---|---|---|
| Polyester: |  |  |  |  |
| Grams | 77.1 | 77.1 | 380 | 380 |
| Mole Ratio | 1.0 | 1.0 | 1.0 | 1.0 |
| Diisocyanate: |  |  |  |  |
| Grams | 12.1 | 12.1 | 67.6 | 67.6 |
| Mole Ratio | 1.18 | 1.18 | 1.34 | 1.34 |
| n-Propyl alcohol: |  |  |  |  |
| Grams | .20 | .20 | 2.42 | 2.42 |
| Mole Ratio | .08 | .08 | .20 | .20 |
| Tonox[1]: |  |  |  |  |
| Grams | .39 | .39 |  |  |
| Mole Ratio | .05 | .05 |  |  |
| Ethylene diamine: |  |  |  |  |
| Grams |  |  | 1.82 | 1.82 |
| Mole Ratio |  |  | .15 | .15 |
| Dicumyl peroxide (40%), phr | 4 | 8 | 4 | 8 |
| Scott Tensile, p.s.i. | 2,445 | 2,945 | 1,985 | 2,950 |
| Elongation, percent | 780 | 520 | 730 | 540 |
| Set | .21 | .05 | .21 | .07 |
| Durometer A | 39 | 48 | 41 | 47 |
| Autog. S.S., p.s.i. at— |  |  |  |  |
| 100% Elong | 100 | 185 | 90 | 175 |
| 200% Elong | 140 | 310 | 150 | 280 |
| 300% Elong | 200 | 475 | 210 | 440 |

[1] Tonox is p,p'-diaminodiphenylmethane.

EXAMPLE 19

Example 18 was repeated with identical proportions and reactants except that allyl alcohol was substituted on an equal mole basis for n-propyl alcohol.

The properties of the raw polymer cured with dicumyl peroxide (40%) were as set forth in the following table.

TABLE 19

|  | 19-A | 19-B | 19-C | 19-D |
|---|---|---|---|---|
| Polyester: |  |  |  |  |
| Grams | 77.1 | 77.1 | 380 | 380 |
| Mole Ratio | 1.0 | 1.0 | 1.0 | 1.0 |
| Diisocyanate: |  |  |  |  |
| Grams | 12.1 | 12.1 | 67.6 | 67.6 |
| Mole Ratio | 1.18 | 1.18 | 1.34 | 1.34 |
| Allyl alcohol: |  |  |  |  |
| Grams | .19 | .19 | 2.34 | 2.34 |
| Mole Ratio | .08 | .08 | .20 | .20 |
| Tonox: |  |  |  |  |
| Grams | .39 | .39 |  |  |
| Mole Ratio | .05 | .05 |  |  |
| Ethylene diamine: |  |  |  |  |
| Grams |  |  | 1.82 | 1.82 |
| Mole Ratio |  |  | .15 | .15 |
| Dicumyl peroxide (40%), phr | 4 | 8 | 4 | 8 |
| Scott Tensile, p.s.i. | 3,535 | 3,190 | 3,480 | 1,535 |
| Elongation, percent | 610 | 480 | 510 | 360 |
| Set | .05 | .03 | .04 | .04 |
| Durometer A | 48 | 55 | 54 | 56 |
| Autog. S.S., p.s.i. at — |  |  |  |  |
| 100% Elong | 175 | 260 | 240 | 360 |
| 200% Elong | 270 | 450 | 400 | 625 |
| 300% Elong | 380 | 675 | 630 | 1,200 |

As seen above, an increase in the amounts of unsaturated mono-functional terminating chemical and urea linkage former significantly improves the cured modulus of the vulcanizates, unlike the case where a saturated mono-functional terminating chemical and urea linkage former are employed (Example 18). Also, a comparison of this example with Example 18 shows that, with all other factors being identical, the use of an unsaturated, rather than a saturated, mono-functional terminating chemical greatly improves the degree of cure, as indicated by modulus.

EXAMPLE 20

In this example, a *saturated* mono-functional chain terminating chemical and a urea linkage former were employed.

67.5 g. (0.27 mole) of p,p'-diphenylmethane diisocyanate was reacted with 1.29 g. (0.04 mole) of methyl alcohol for one hour at 70° C. to form an adduct. This adduct was then added to 400 g. (0.201 mole) of polyethylene propylene (70–30) adipate having a molecular weight of 1980 and 0.36 g. of diethylcyclohexylamine (catalyst) and the mixture was then reacted for one hour at 105° C. Thereafter, 6.0 g. (.03 mole) of p,p'-diaminodiphenylmethane was then added to the above prepolymer and reacted at 105° C. for five minutes to produce a raw polymer. Dicumyl peroxide (40%) was mixed into the raw polymer on a 6 inch mill and the resulting stocks were cured under pressure for one hour at 150° C.

The following table sets forth the properties of the vulcanizates cured with varying amounts of dicumyl peroxide 40 C.

TABLE 20

|  | 20-A | 20-B | 20-C |
|---|---|---|---|
| Dicumyl peroxide (40%), phr | 4 | 6 | 8 |
| Scott Tensile, p.s.i. | 2,990 | 3,100 | 3,120 |
| Elongation, percent | 760 | 620 | 520 |
| Set | .25 | .11 | .04 |
| Durometer A | 43 | 46 | 51 |
| Autog. S.S., p.s.i. at— |  |  |  |
| 100% Elong | 125 | 160 | 200 |
| 200% Elong | 185 | 250 | 325 |
| 300% Elong | 250 | 360 | 525 |

EXAMPLE 21

Example 20 was repeated with identical proportions and reactants except that 2.42 g. (0.04 mole) of isopropyl alcohol, a saturated mono-functional chain terminating chemical, was substituted on an equal mole basis for methyl alcohol.

The properties of the raw polymer cured with dicumyl peroxide (40%) were as set forth in the following table.

TABLE 21

|  | 21-A | 21-B | 21-C |
|---|---|---|---|
| Dicumyl peroxide (40%), phr | 4 | 6 | 8 |
| Scott Tensile, p.s.i | 2,560 | 2,780 | 3,220 |
| Elongation, percent | 810 | 630 | 560 |
| Set | .25 | .15 | .08 |
| Durometer A | 40 | 48 | 49 |
| Autog. S.S. p.s.i. at— | | | |
| 100% Elong | 125 | 175 | 225 |
| 200% Elong | 200 | 275 | 360 |
| 300% Elong | 275 | 400 | 575 |

EXAMPLE 22

Example 20 was repeated with identical proportions and reactants except that 2.92 g. (0.04 mole) of methallyl alcohol, an unsaturated mono-functional chain terminating chemical, was substituted on an equal mole basis for methyl alcohol.

The properties of the raw polymer cured with dicumyl peroxide (40%) were as set forth in the following table.

TABLE 22

|  | 22-A | 22-B | 22-C |
|---|---|---|---|
| Dicumyl peroxide (40%), phr | 4 | 6 | 8 |
| Scott Tensile, p.s.i | 4,850 | 3,970 | 3,880 |
| Elongation, Percent | 540 | 480 | 430 |
| Set | .06 | .05 | .04 |
| Durometer A | 57 | 60 | 60 |
| Autog. S.S., p.s.i. at— | | | |
| 100% Elong | 285 | 325 | 340 |
| 200% Elong | 435 | 525 | 570 |
| 300% Elong | 666 | 960 | 1,258 |

The degree of cure attained in this example, which employs an unsaturated mono-functional chain terminating chemical, is vastly superior to that attained in Examples 20 and 21 which were identical to this example except for the use of a saturated, rather than an unsaturated, mono-functional chain terminating chemical. It should also be noted that the use of different saturated mono-functional chain terminating chemicals in Examples 20 and 21 resulted in vulcanizates which did not appreciably differ one from the other in the degree of cure attained.

EXAMPLE 23

In this example, 78.2 g. (0.042 mole) of polyethylene adipate, having a molecular weight of 1880, a hydroxyl number of 59.0 and an acid number of 0.8 was reacted with 11.7 g. (0.047 mole) of p,p'-diphenylmethane diisocyanate and 0.0018 mole of the mono-functional chain terminating chemical indicated in Table 23 below. The raw polymer was compounded with 4 parts of dicumyl peroxide per 100 parts of the raw polymer and cured in a press at 150° C. for 60 minutes.

TABLE 23

|  | 23-A | 23-B |
|---|---|---|
| Mono-functional chemical | (1) | (2) |
| Grams | 0.13 | 0.12 |
| Moles | 0.0018 | 0.0016 |
| Scott Tensile: | | |
| P.s.i | 6,140 | 5,310 |
| Elongation, percent | 610 | 600 |
| Durometer A | 52 | 65 |
| Autog. S.S., p.s.i. at— | | |
| 100% Elong | 200 | 200 |
| 200% Elong | 290 | 270 |
| 300% Elong | 390 | 360 |
| 400% Elong | 670 | 650 |

1 Methallyl alcohol.
2 Isobutyl alcohol.

The above results indicate that when a urea linkage former is not present, the resulting polyurethane elastomer terminated with an unsaturated mono-functional chemical shows no significant improvement over a polyurethane elastomer which has been terminated with a saturated mono-functional chemical, or over a polyurethane elastomer which has been terminated with a glycol (see Examples 17–B and 17–D).

EXAMPLE 24

Example 15 was repeated with identical proportions and reactants, except that the urea linkage former (p,p'-diaminodiphenylmethane) was not employed.

The raw polymer, having a Mooney viscosity (ML-6 at 100° C.) of 7, cured with varying amounts of dicumyl peroxide (40%) had the properties set forth in the following table.

TABLE 24

|  | 24-A | 24-B | 24-C |
|---|---|---|---|
| Dicumyl peroxide (40%), phr | 4 | 6 | 8 |
| Scott Tensile, p.s.i | 800 | 2,670 | 1,830 |
| Elongation, percent | 650 | 530 | 440 |
| Set | .12 | .04 | .03 |
| Durometer A | 32 | 45 | 51 |
| Autog. S.S., p.s.i. at— | | | |
| 100% Elong | 65 | 165 | 200 |
| 200% Elong | 100 | 260 | 335 |
| 300% Elong | 140 | 400 | 550 |

In this example, 0.24 mole of methallyl alcohol per mole of polyester was employed; whereas, in Example 23–A, 0.04 mole of methallyl alcohol per mole of polyester was employed. However, the modulus of Example 24–C was not significantly greater than the modulus of Example 23–A. Thus it is seen that the use of an unsaturated mono-functional terminating chemical, in the absence of a urea linkage former, has no significant effect on the modulus of the resulting cured polyurethane elastomer. As was pointed out in Examples 17 and 18, the use of a urea linkage former, in the absence of an unsaturated mono-functional chain terminating chemical, has no significant effect on the degree of cure (modulus) attainable with the resulting polyurethane elastomer. In conclusion, the unexpected result realized by the instant invention is that the concurrent use of a urea linkage former U and an unsaturated mono-functional chain terminating chemical T has a profound effect on the degree of cure attainable with the resulting polyurethane elastomer (see Examples 15, 19 and 22 in particular).

The 200% modulus at various levels of curative of the preceding examples, which employed between 0.20 and 0.24 mole of mono-functional terminating chemical T per mole of polyester (mole ratio) and between 0.15 and 0.17 mole of urea linkage former U per mole of polyester (mole ratio) is plotted in the accompanying drawing.

The polyurethanes of the invention are useful in general as replacements or substitutes for previously used rubbery materials. Their excellent physical properties render them useful in the manufacture of rubber or rubber-like articles, such as tires or portions thereof (whether pneumatic or solid); conveyor belts or power-transmission belts, including textile processing aprons or tapes; hose or tubing and the like; as well as all sorts of sheeting or molded articles. Fabric or similar reinforcement may be embedded in or laminated with the polyurethane in accordance with well-known practice in the rubber industry, although in many cases the polyurethane itself may have sufficient strength, especially when mixed with flock or the like.

Having thus described my invention, what I claim and desire to protect by Letters Patent is:

1. A method of making a synthetic elastomer comprising the steps of reacting (P) a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; (D) an organic diisocyanate free of isocyanate-reactive groups; and (T) a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; and reacting the resultant product with (U) a urea linkage former containing at least two active hydrogen atoms selected from the group consisting of diamines, water, amino-alcohols, and amino-phenols; the proportions of said reactants being as follows: (P) 1.0 mole; (T) 0.06 to 0.7 mole; (U) 0.05 to 0.6 mole; and (D) 1.0 to 1.25 equivalent for each equivalent of isocyanate-reactive groups in (P), (T), and (U).

2. A method as defined in claim 1 comprising the additional steps of mixing from 1 to 10 parts by weight of an organic peroxide selected from the group consisting of di-tertiary-alkyl peroxides and dicumyl peroxide with 100 parts by weight of the reaction product of (P), (D), and (T) with (U), and curing the resultant mixture.

3. A method of making a synthetic elastomer comprising the steps of forming a first reaction product by reacting a mixture comprising (D) an organic diisocyanate free of isocyanate-reactive groups and (T) a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; thereafter forming a second reaction product by reacting said first reaction product with (P) a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; and thereafter reacting said second reaction product with (U) a urea linkage former containing at least two active hydrogen atoms selected from the group consisting of diamines, water, amino-alcohols, amino-phenols; the proportions of said reactants being as follows: (P) 1.0 mole; (T) 0.06 to 0.7 mole; (U) 0.05 to 0.6 mole; and (D) 1.0 to 1.25 equivalents for each equivalent of isocyanate-reactive groups in (P), (T), and (U).

4. A method of making a synthetic elastomer comprising the steps of forming a first reaction product by reacting (1) a substance (T) wherein the number of carbon atoms does not exceed 20, said substance containing only one group reactive with carboxylic acids and anhydrides thereof and containing ethylenic unsaturation, selected from the group consisting of primary alcohols, secondary aliphatic alcohols, and secondary aliphatic-aromatic alcohols; (2) a material selected from the group consisting of saturated dicarboxylic acids and anhydrides thereof; and (3) a saturated glycol: the proportions of (1), (2) and (3) being that which form a substantially linear, substantially saturated polyester (P) having a molecular weight of from 1000 to 4000 and an acid number of less than 6, said polyester (P) being substantially terminated with said substance (T) and hydroxyl groups; thereafter forming a second reaction product by reacting said first-reaction product with (D) an organic diisocyanate free of isocyanate-reactive groups; and thereafter reacting said second reaction product with (U) a urea linkage former containing at least two active hydrogen atoms selected from the group consisting of diamines, water, amino-alcohols, and amino-phenols; the proportions of said reactants being as follows: (P) 1.0 mole; (T) 0.06 to 0.7 mole; (U) 0.05 to 0.6 mole; and (D) 1.0 to 1.25 equivalents for each equivalent of isocyanate-reactive groups in said first reaction product and (U).

5. A method of making a synthetic elastomer comprising the steps of heating at a temperature of from 50° to 150° C. (P) a substantially linear, substantially saturated, substantially hydroxy-terminated polyester having a molecular weight of from 1000 to 4000 and an acid number of less than 6 obtained by the esterification of a material selected from the group consisting of saturated dicarboxylic acids and anhydrides thereof with a saturated glycol; (D) an organic diisocyanate free of isocyanate-reactive groups; and (T) a substance selected from the group consisting of allyl alcohol, methallyl alcohol, methylvinyl carbinol, propargyl alcohol, and beta-allyloxy ethyl alcohol until reaction is substantially complete; and reacting the resultant product with (U) a urea linkage former containing at least two active hydrogen atoms selected from the group consisting of diamines, water, amino-alcohols, and amino-phenols; the proportions of said reactants being as follows: (P) 1.0 mole; (T) 0.06 to 0.7 mole; (U) 0.05 to 0.6 mole; and (D) 1.0 to 1.25 equivalents for each equivalent of isocyanate-reactive groups in (P), (T), and (U).

6. A method of making a synthetic elastomer comprising the steps of forming a first reaction product by heating at a temperature of from 50° to 150° C. a mixture comprising (D) an organic diisocyanate free of isocyanate-reactive groups and (T) a substance selected from the group consisting of allyl alcohol, methallyl alcohol, methylvinyl carbinol, propargyl alcohol, and beta-allyloxy ethyl alcohol; thereafter forming a second reaction product by reacting said first reaction product with (P) a substantially linear, substantially saturated, substantially hydroxy-terminated polyester having a molecular weight of from 1000 to 4000 and an acid number of less than 6 obtained by the esterification of a material selected from the group consisting of saturated dicarboxylic acids and anhydrides thereof with a saturated glycol; and thereafter reacting said second reaction product with (U) a urea linkage former containing at least two active hydrogen atoms selected from the group consisting of diamines, water, amino-alcohols, and amino-phenols; the proportions of said reactants being as follows: (P) 1.0 mole; (T) 0.06 to 0.7 mole; (U) 0.05 to 0.6 mole; and (D) 1.0 to 1.25 equivalents for each equivalent of isocyanate-reactive groups in (P), (T), and (U).

7. A polymer having the formula:

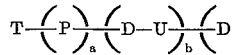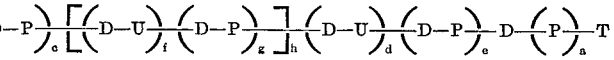

wherein $a$ is an integer selected from the group consisting of zero and one; $b$, $c$, $d$ and $e$ are integers including zero; $f$, $g$ and $h$ are integers greater than zero; where $a$ is zero, P is the polymeric residue remaining after removal of the hydrogen atoms from the terminal groups of a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; where $a$ is one, P is the polymeric residue remaining after removal of the hydrogen atoms from the terminal groups of a substantially linear, substantially saturated, substantially hydroxy-terminated polyester having a molecular weight of from 1000 to 4000 and an acid number of less than 6 obtained by the esterification of a material selected from the group consisting of dicarboxylic acids and anhydrides thereof with a glycol; D is the radical remaining after addition of hydrogen atoms to the isocyanate groups of an organic diisocyanate free of isocyanate-reactive groups; T is the radical remaining after removal of the active hydrogen atom from a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; U is the radical remaining after removal of at least two active hydrogen atoms from a urea linkage former containing at least two active hydrogen atoms selected from the group consisting of diamines, water, amino-alcohols and amino-phenols; the proportions being as follows: (P) 1.0 mole; (T) 0.06 to 0.7 mole; (U) 0.05 to 0.6 mole.

8. A synthetic elastomer comprising 100 parts by weight of a polymer as defined in claim 7 cured with from 1 to 10 parts by weight of an organic peroxide selected from the group consisting of di-tertiary-alkyl peroxides and dicumyl peroxide.

9. A polymer having the formula:

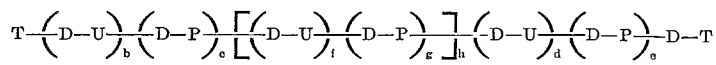

wherein $b$, $c$, $d$ and $e$ are integers including zero; $f$, $g$ and $h$ are integers greater than zero; P is the polymeric residue remaining after removal of the hydrogen atoms from the terminal groups of a substantially linear, substantially saturated, substantially hydroxy-terminated material selected from the group consisting of polyesters having a molecular weight of from 1000 to 4000 and having an acid number of less than 6 obtained by the esterification of a material selected from the group consisting of dicarboxylic acids and anhydrides thereof with a glycol and polyethers having a molecular weight of from 500 to 3000 and having the ether linkages thereof separated by linear alkyl hydrocarbon chains of from two to five carbon atoms; D is the radical remaining after addition of hydrogen atoms to the isocyanate groups of an organic diisocyanate free of isocyanate-reactive groups; T is the radical remaining after removal of the active hydrogen atom from a substance wherein the number of carbon atoms does not exceed 20, said substance containing only one group reactive with isocyanate and containing ethylenic unsaturation, selected from the group consisting of primary alcohols, secondary aliphatic alcohols, and secondary aliphatic-aromatic alcohols; U is the radical remaining after removal of at least two active hydrogen atoms from a urea linkage former containing at least two active hydrogen atoms selected from the group consisting of diamines, water, amino-alcohols, and amino-phenols; the proportions being as follows: (P) 1.0 mole; (T) 0.06 to 0.7 mole; (U) 0.05 to 0.6 mole.

10. A polymer having the formula:

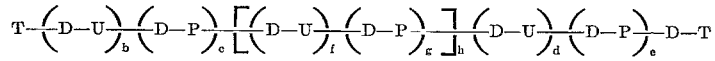

wherein $b$, $c$, $d$ and $e$ are integers including zero; $f$, $g$ and $h$ are integers greater than zero; P is the polymeric residue remaining after removal of the hydrogen atoms from the terminal groups of a substantially linear, substantially saturated, substantially hydroxy-terminated polyester having a molecular weight of from 1000 to 4000 and an acid number of less than 6 obtained by the esterification of a material selected from the group consisting of saturated dicarboxylic acids and anhydrides thereof with a saturated glycol; D is the radical remaining after addition of hydrogen atoms to the isocyanate groups of an organic diisocyanate free of isocyanate-reactive groups; T is the radical remaining after removal of the active hydrogen atom from a substance selected from the group consisting of allyl alcohol, methallyl alcohol, methylvinyl carbinol, propargyl alcohol, and beta-allyloxy ethyl alcohol; U is the radical remaining after removal of at least two active hydrogen atoms from a urea linkage former containing at least two active hydrogen atoms selected from the group consisting of diamines, water, amino-alcohols, and amino-phenols; the proportions being as follows: (P) 1.0 mole; (T) 0.06 to 0.7 mole; (U) 0.05 to 0.6 mole.

References Cited
UNITED STATES PATENTS

| | | | |
|---|---|---|---|
| 3,135,711 | 6/1964 | Thoma et al. | 260—30.4 |
| 2,529,512 | 11/1950 | Ott | 260—75 |
| 2,917,486 | 12/1959 | Nelson et al. | 260—77.5 |
| 2,929,800 | 3/1960 | Hill | 260—77.5 |
| 3,036,042 | 5/1962 | Schmidt et al. | 260—75 |
| 3,047,530 | 7/1962 | Neschk et al. | 260—75 |
| 3,100,759 | 8/1963 | Boussu et al. | 260—77.5 |

HOSEA E. TAYLOR, JR., Acting Primary Examiner

H. S. COCKERAM, Assistant Examiner

U.S. Cl. X.R.

260—45.7, 75, 77.5, 859